United States Patent [19]

Kissh et al.

[11] Patent Number: 5,260,557
[45] Date of Patent: Nov. 9, 1993

[54] METHOD AND APPARATUS FOR ACQUISITION AND TRACKING OF LIGHT SOURCES IN A TRANSIENT EVENT RICH ENVIRONMENT

[75] Inventors: Frank Kissh, Thomaston; David Flynn, New Canaan; Walter Fowski, Easton; Rene Abreu, New Fairfield; Kenneth Miklus, Fairfield; Kenneth Bolin, Southbury, all of Conn.

[73] Assignee: Hughes Aircraft Company, Los Angeles, Calif.

[21] Appl. No.: 829,459

[22] Filed: Jan. 31, 1992

[51] Int. Cl.$^5$ .......................... G01J 1/20; H04N 7/00; G06K 9/20
[52] U.S. Cl. .............................. 250/203.6; 250/208.1; 382/48; 358/103
[58] Field of Search ............... 250/203.6, 208.1, 203.3, 250/203.1; 358/109, 103; 382/50–53, 48, 27, 1; 356/141, 152

[56] References Cited

U.S. PATENT DOCUMENTS

| | | | |
|---|---|---|---|
| 4,388,646 | 6/1983 | Strother | 250/203.6 |
| 4,658,431 | 4/1987 | Yokota | 358/103 |
| 4,679,753 | 7/1987 | Landecker | 250/206.1 |
| 4,944,587 | 7/1990 | Harigae | 250/203.6 |
| 4,979,221 | 12/1990 | Perryman et al. | 382/27 |
| 5,012,081 | 4/1991 | Jungwirth et al. | 250/203.6 |

*Primary Examiner*—David C. Nelms
*Assistant Examiner*—Michael Messinger
*Attorney, Agent, or Firm*—Wanda K. Denson-Low; Michael W. Sales; Robert A. Hays

[57] ABSTRACT

A method and apparatus for tracking a light source in a transient event rich environment locks on to a light source incident on a field-of-view 1 of a charge-coupled-device (CCD) array 6, validates the permanence of said light source and transmits data relating to the brilliance and location of said light source if said light source is determined to be permanent.

36 Claims, 12 Drawing Sheets

THE DETAILS OF THE METHOD WILL BE DESCRIBED USING THE STATE DIAGRAM SHOWN ABOVE. EACH STATE IS SHOWN AS A BUBBLE, AND CORRESPONDS TO 100 mS OF PROCESSING TIME. THE OPERATIONS PERFORMED IN EACH BUBBLE WILL BE DESCRIBED ON THE FOLLOEING CHARTS. ARROWS INDICATE TRANSITIONS BETWEEN STATES AND CAN BE DESCRIBED BY A SET OF TRANSITION RULES.

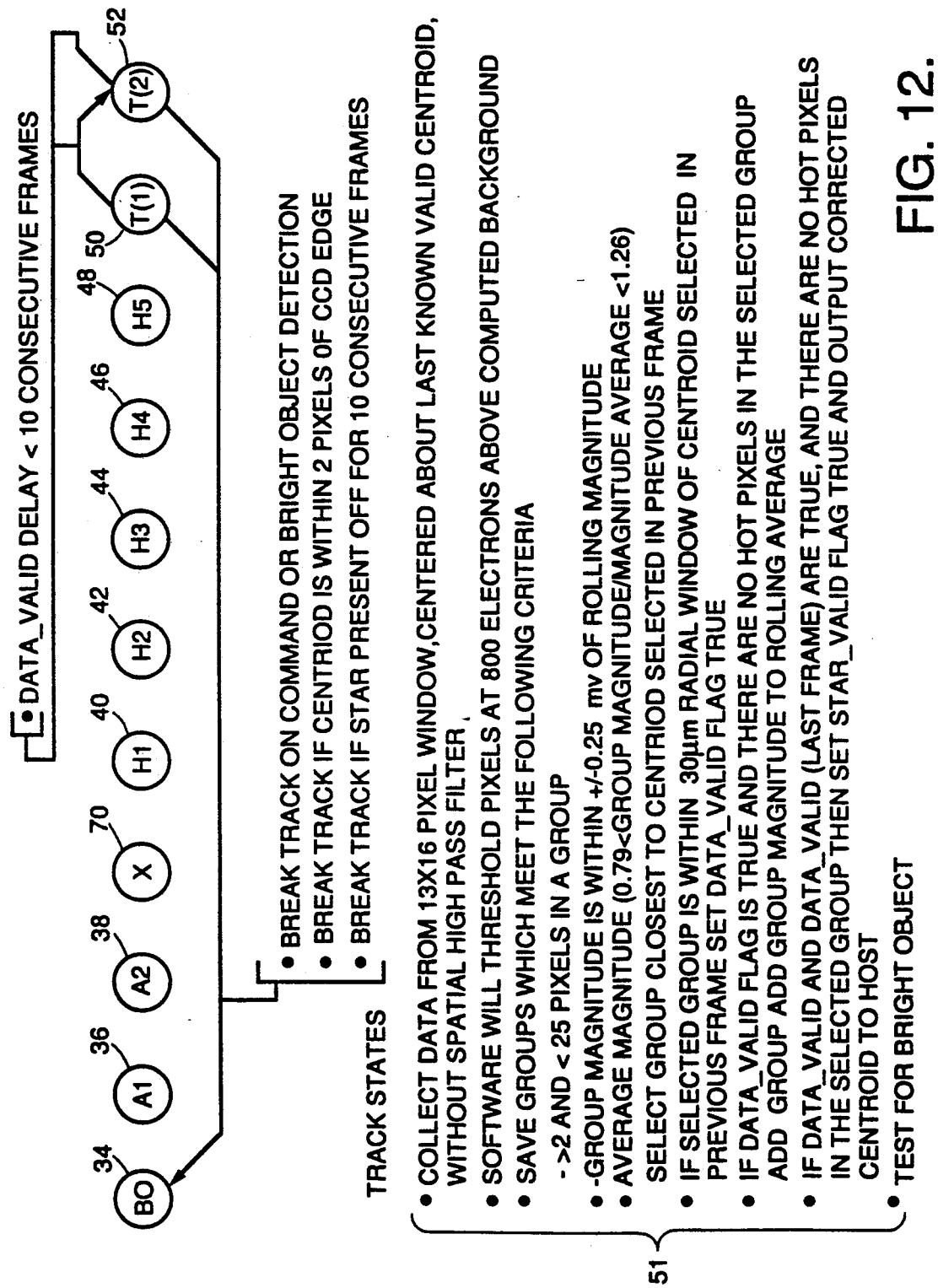

METHOD AND APPARATUS FOR ACQUISITION AND TRACKING OF LIGHT SOURCES IN A TRANSIENT EVENT RICH ENVIRONMENT

The invention described herein was made in the performance of work under NASA Contract Number NAS7-918 and is subject to the provisions of Section 305 of the National Aeronautics and Space Act of 1958 (72 Stat. 435; 42 U.S.C. 2457).

FIELD OF THE INVENTION

The present invention relates to a method and apparatus to process data from a charged-coupled-device (CCD) for tracking a light source and, more particularly, to a method and apparatus to process data from a CCD device so as to acquire, validate and track a light source in a transient event rich environment. In addition, the method insures that the position and magnitude information that is sent to the host is uncorrupted by the transient events.

DESCRIPTION OF THE PRIOR ART

It is well known that charge-coupled-device (CCD) solid state detectors can be used for detecting electromagnetic radiation at the wavelengths of light. Such prior art CCD devices are commonly used to detect and track light sources such as stars. When such CCD devices are used in space for tracking stars, they are often subjected to transient events, such as proton radiation bombardment, which interferes with the ability to acquire and track a light source or corrupts the accuracy determination of position and/or intensity of the light source. For example, when tracking stars with a prior art acquisition and tracking method and apparatus, the proton radiation bombardment of a CCD solid state detector may appear for a moment to the detector as though a star or a group of stars exists when in fact no star or group actually exists. If the false signal occurs at the position of the star, the data is corrupted and shall not be reported to the host. Thus, because the CCD detectors cannot distinguish between transient events or actual stars, the prior art methods and apparatus cannot accurately acquire and track such light sources without using large amounts of processing time to perform image comparisons, or without using some other external technique that supplies information to the device for tracking purposes.

Therefore, the present invention improves upon prior art tracking methods and apparatus by providing a method and apparatus which can acquire, validate and track a light source in a transient event rich environment. Also, the method and apparatus can acquire and track light sources without knowledge of the object's direction, without velocity filtering, and with limited processing resources. If processing resources permit, direction and/or velocity filtering can be used to further enhance then method.

SUMMARY OF THE INVENTION

The present invention is a method and apparatus to acquire, validate and track a light source in a transient event rich environment. The method and apparatus utilizes a standard charge-coupled-device (CCD) solid state detector for detecting light sources, such as stars.

First, a small portion of the array is evaluated to determine if a signal in the field-of-view is so intent as to be caused by a bright object which could damaged the array. If such an intense signal exists a shutter is closed to block the input light. The method and apparatus examines an array of pixels of the CCD detector to determine whether any signal sources are present. The method and apparatus then performs a second examination of the same array to determine if the same signal sources are still present within some degree of error. During these two initial examinations, a high-pass filter is used to quickly sort out those pixels which have an externally generated signal. This high-pass filter technique subtracts the signal level of a pixel which precedes the current pixel by a few pixels and then subtracts a predefined threshold level. If the result exceed zero, the pixel is judged to have an externally generated signal on it. If the same signal sources are present during both examinations, then the method and apparatus selects one signal source and begins to accumulate data on the intensity of the signal source so as to validate its presence.

Once a light source is validated, the method and apparatus transfers the light source to a tracking step so that the light source may be tracked.

One objective of the present invention is to provide a method and apparatus for rapid acquisition and tracking of light sources with a high degree of confidence.

Another objective is to provide such a method and apparatus that which can validate light sources and track their motions without knowledge of the directions of motion of the light sources.

A further objective is to provide such a method and apparatus which can validate the presence of light sources and track their motion without velocity filtering their respective motion, if limited processing resources prevents their use.

Another objective of the present invention is to validate and track light sources using limited processing resources.

Another objective of the present invention is to inform a host as to the validity of data.

Other objects and advantages of the present invention will become apparent to those skilled in the art from the following detailed description read in conjunction with the attached drawings and claims.

DESCRIPTION OF THE DRAWINGS

FIG. 12 is a state diagram illustrating the steps of the tracking states.

DETAILED DESCRIPTION OF THE INVENTION

Figure 1:
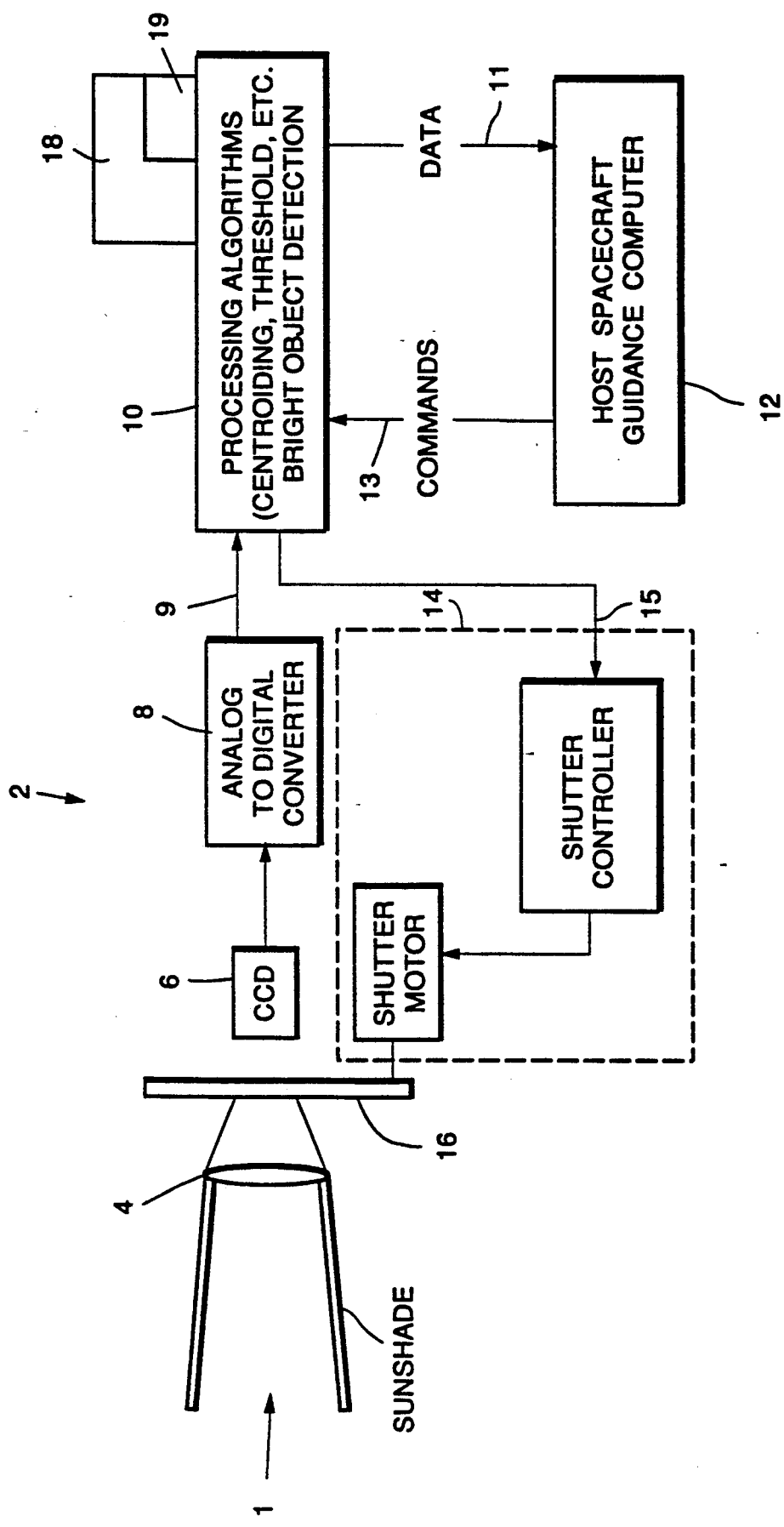
FIG. 1 is a block diagram illustrating the apparatus of the present invention.

The specific implementation of the method and apparatus which includes the techniques of the invention is presented herein. The present invention is a method and apparatus to acquire, validate and track light sources in a transient event rich environment. FIG. 1 shows the apparatus used to acquire, validate and track light sources. Referring to FIG. 1, potential light sources within the field-of-view 1 of the system 2 are focused by an optical system 4 onto a charge-coupled-device (CCD) array 6. The data collected by the array is processed by an analog-to-digital converter 8 where it is uploaded via a bus 9 to a processor 10. The processor 10 is responsible for analyzing a potential light source for acquisition, validation and tracking determinations. The processor 10 uploads to a host 12 via a second bus 11 information about the position and magnitude of a light source acquired, validated, and tracked in the field-of-vie 1 at a particular time. The host 12 downloads information such as magnitude thresholds and CCD integration times to the processor 10 via a third bus 13 connected between the processor 10 and the host 12. The processor 10 is also connected to a shutter controller 14 and motor via a fourth bus 15 so that a shutter 16 disposed between the CCD array and the optical system may be activated or deactivated. The processor also has memory 18 having a portion thereof reserved for a magnitude rolling average accumulator 19.

The CCD array used in the apparatus 1 is a 100,000 pixel standard charge-coupled-device (CCD) used for detecting light sources, such as stars. Of course other size CCD's and detecting arrays can be used if desired. The 100,000 pixel CCD solid-state detector 6 used by the present invention is arranged in an array having approximately 256 pixels in a row and approximately 403 pixels in a column. Although 100,000 pixels are available, in the interest of acquisition speed and because of microprocessor limitations, the present invention only interrogates the photocharge of a reduced field of a 19×403 array at any given time. The 19×403 pixels array integrated is called an acquisition band. In this implementation, each acquisition band is adjacent to the next (except for a small overlap between the adjacent bands) and the bands are interrogated in sequence until a candidate star is identified or the entire field-of-view of the apparatus (256×403 pixels) is interrogated. In the latter case the sequence is repeated until a candidate star is identified.

Figure 2:
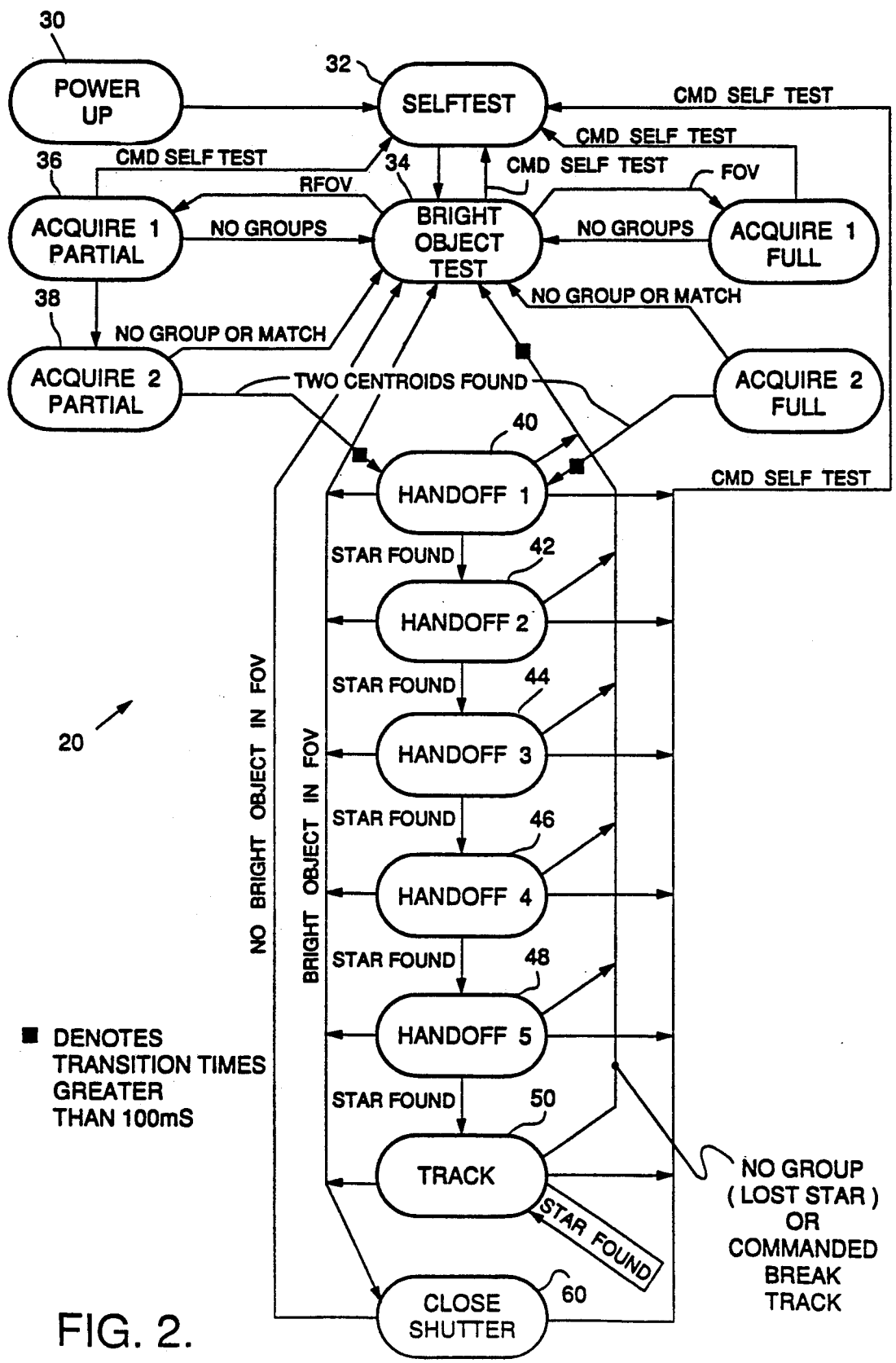
FIG. 2 is a system state diagram of the method of the present invention.
Figure 3:
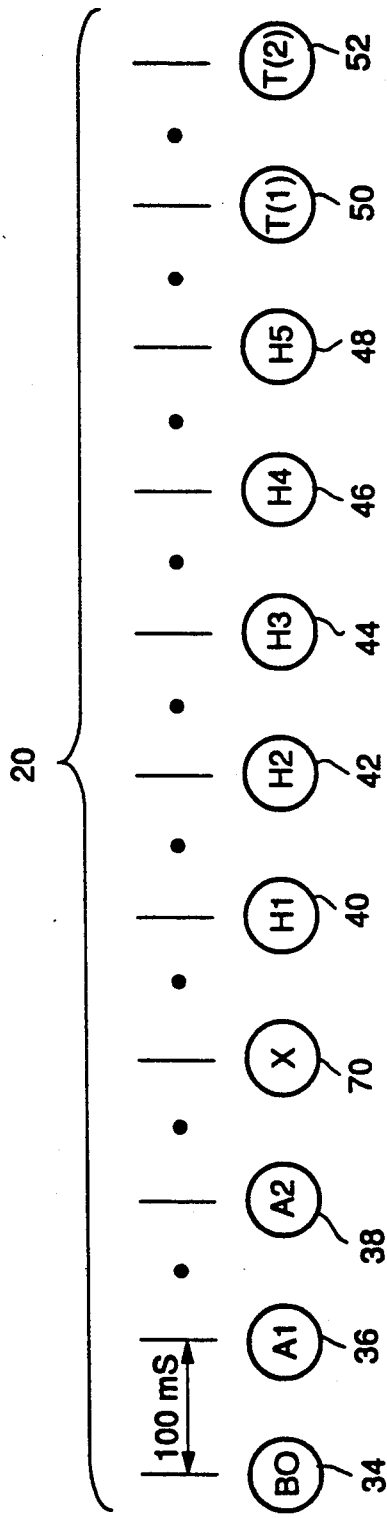
FIG. 3 is a state diagram illustrating the states of the present invention.
Figure 4:
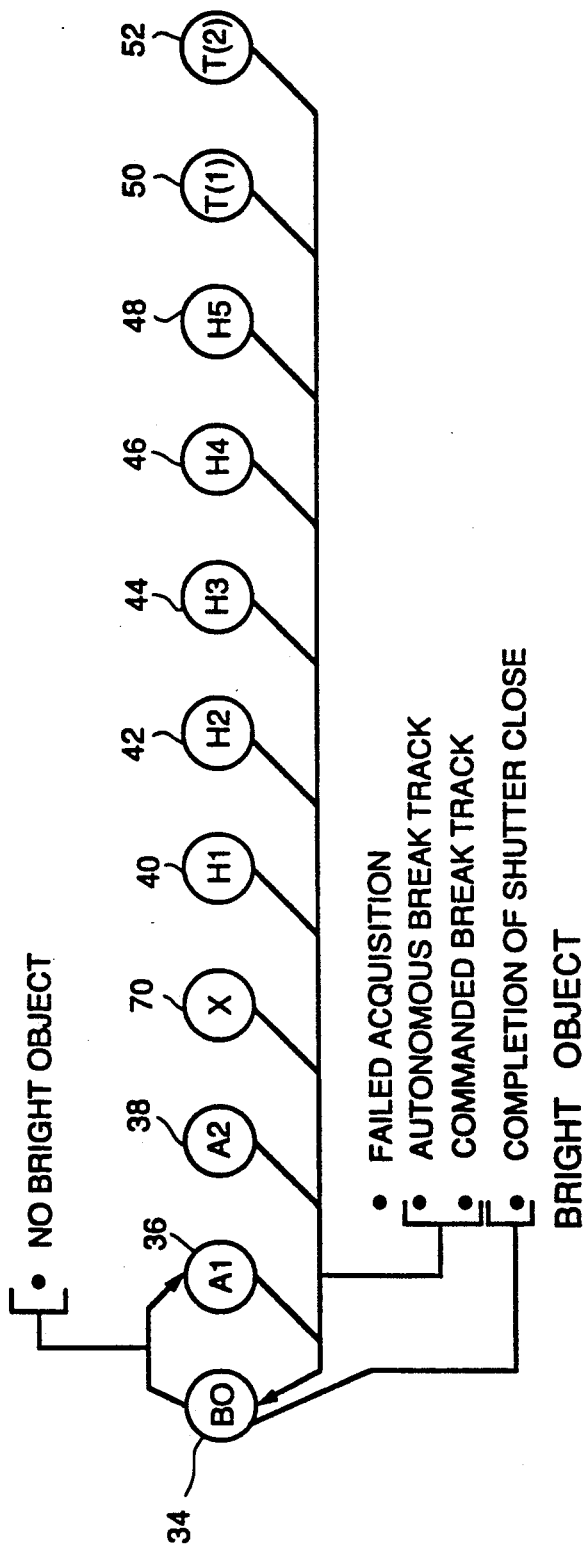
FIG. 4 is a state diagram illustrating the steps of the bright object state.

The method of the present invention comprises a plurality of interconnected states 20, as generally shown in FIG. 2, which can be performed by processor 10. The method of the present invention has been successfully performed on an Intel 8086 micro computer. The bubbles, such as 34 shown in FIG. 3, represents a state that the present invention executes when acquiring or tracking a light source. Each bubble in turn represents a set of steps, such as steps 37 for acquisition state 1 shown in FIG. 5, which are executed and, when taken as a whole, perform the acquiring, validating and tracking functions of the present invention. The processor used to implement the present invention devotes approximately 100 ms to the execution of the steps of any given state represented by a bubble. Transitions between states are defined by a set of transition rules.

Referring to FIG. 2, the method is preceded by a power-up state 30 which is followed by a self-test state 32. After performing the self-test state, the present invention enters a bright object test state 34 wherein the state tests for a bright object so as to prevent damage to the CCD 6. The state 34 comprises a plurality of substeps 35. As will be seen later, the bright object test state 34 may be entered from any other state upon the interruption of light source tracking, upon failed acquisition of a light source, or an interrupt command from the host 12.

The bright object test reads data without using a spatial highpass filter and then computes the background illumination level from a 13 by 15 pixel window on the CCD center. The computation for the background illumination accounts for background illumination from sources such as scattered light or solar radiation that is not necessarily in the field-of-view of the imaging apparatus but affects the array enough to create a gradient of background light across the array. When test 34 detects large background illumination (150 pixels exceeding 200 counts or 80,000 electrons), the tests enters and remains in a closed shutter state 60 where a signal is output to shutter control 14 to close shutter 16 and then the state returns to the beginning step of the bright object test state 34. If no bright object is detected within 100 ms, the bright object test state is exited and a first acquisition state 36 is entered. The bright object test 34 is reentered upon the occurrence of a failed acquisition in the acquisition state 36, an autonomous interruption of tracking, a command to interrupt tracking, or a completion of the shutter closing state 60.

Figure 5:
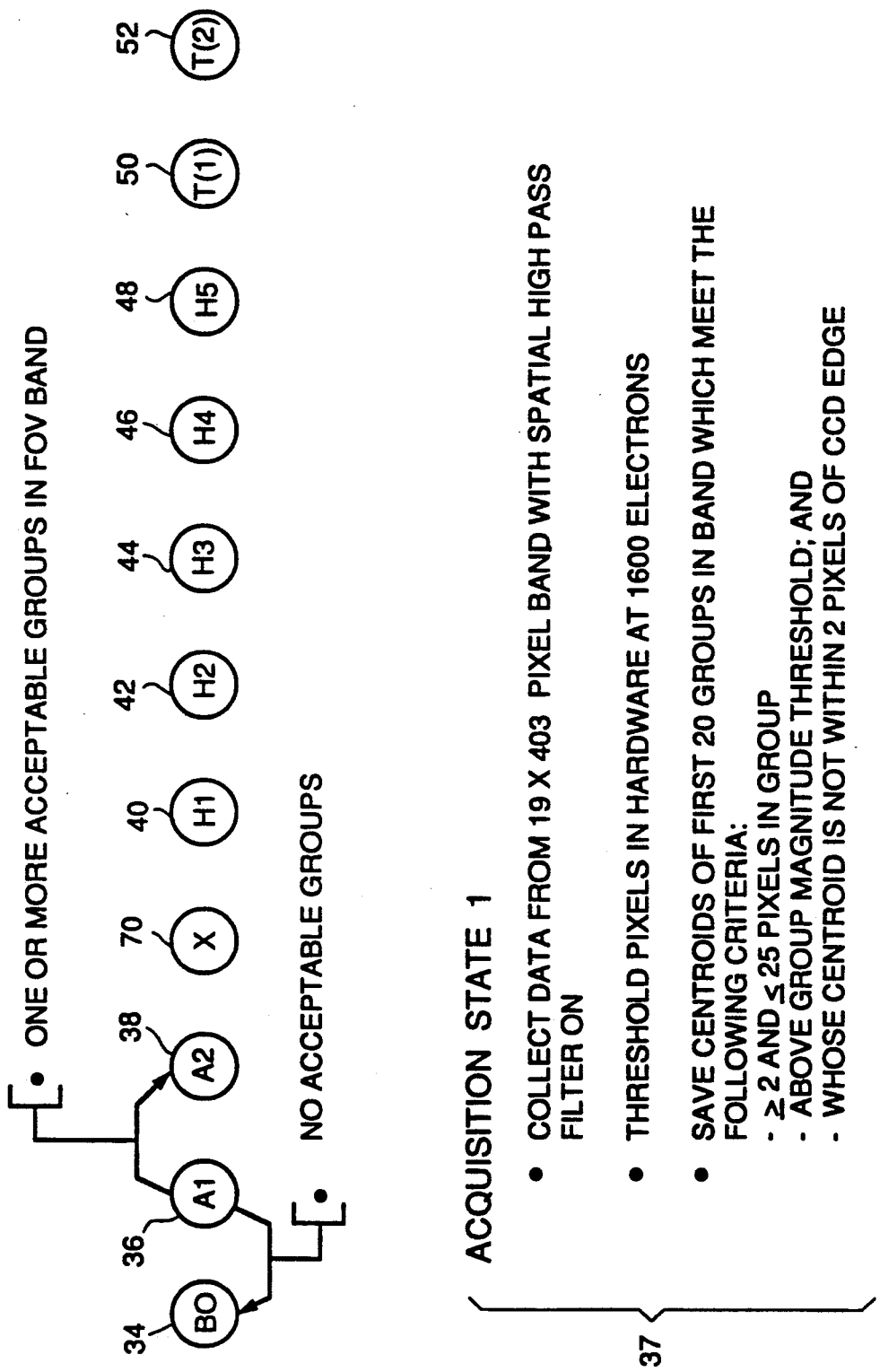
FIG. 5 is a state diagram illustrating the steps of the first acquisitions state.

Referring to FIGS. 2, 3 and 5, the first acquisition state 36 follows the bright object test 34 and comprises a plurality of steps 37. First, using a spatial high pass filter, the first acquisition state scans the acquisition band comprising 19×403 pixels in the field-of-view (FOV) to find pixels with photocharge that exceed a 1600 electron preset threshold. Next, the first acquisition state saves centroids of the first twenty groups found in the band which have at least two and not more than twenty-five pixels in the group, where the magnitude of the group is above a preset group magnitude threshold and where the centroid of the group is not within 2 pixels of the acquisition band edge. If no acceptable groups are found by the first acquisition step, the first acquisition step is exited and the bright object test state 34 is reentered. If one or more acceptable groups are found in the acquisition band, a second acquisition state 38 is entered.

Figure 6:
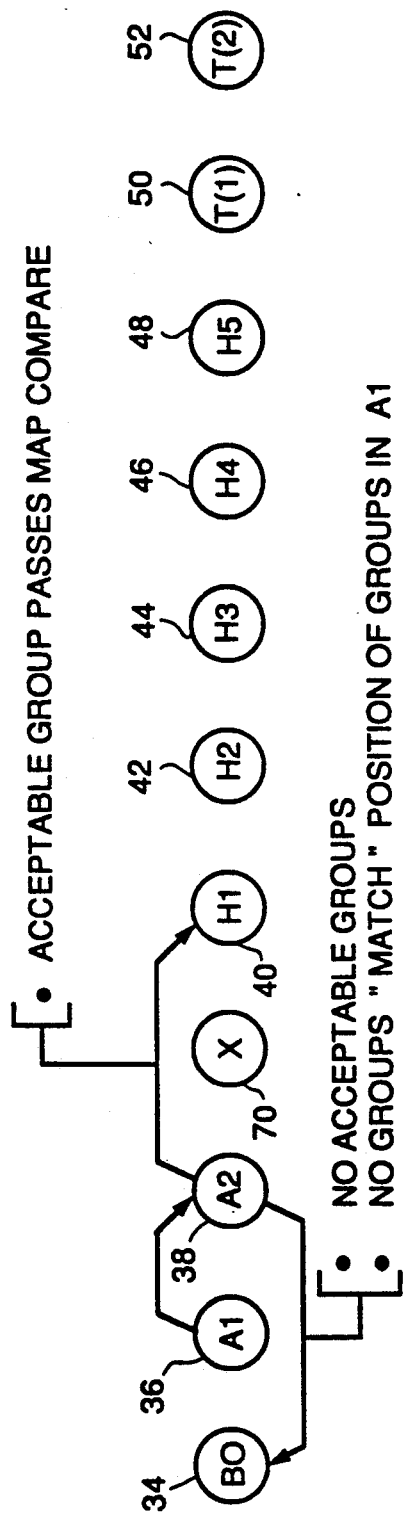
FIG. 6 is a state diagram illustrating the steps of the second acquisition state.

Referring to FIGS. 2, 3 and 6, the second acquisition state 38 is similar to the first acquisition state and comprises a plurality of steps 39. First, using a spatial high pass filter, the second acquisition state 38 scans the same 19×403 pixel data band as scanned in the first acquisition state 36 to find pixels that exceed a 1600 electron preset threshold. Next, the second acquisition state saves the centroids of the first twenty groups in the band which have at least two and not more than twenty-five pixels in the group, where the magnitude of the group is above the group magnitude threshold, and where the centroid of the group is not within 2 pixels of the edge of the CCD array. After acquiring up to 20 group centroids, the second acquisition state begins comparing the centroid of every group found in the second acquisition state 38 with every group centroid found in the first acquisition state 36. If a second acquisition state centroid is within a 5×5 pixel window, centered about an first acquisition state centroid, the group passes the map compare criteria and is considered a match. If the groups found to match do not contain any "hot" pixels (i.e., pixels known to produce excessive dark signal), the second acquisition state saves the centroid of the second acquisition state group that matches the first acquisition state group. The 5×5 pixel window size around all of the first acquisition state groups is determined by the specific optical system parameters, the pixel sizes and the anticipated maximum line-of-sight motion thereby allowing for slight movement of the groups. Thus, the comparison continues until a match is found.

If a match is found and a centroid is saved, the second acquisition state is exited and a first handoff state 40 is entered. If no acceptable groups from the first acquisition state match any of the second acquisition state groups or if the only matching groups contain hot pixels, then the second acquisition state is exited and the bright object test is reentered.

Figure 7:
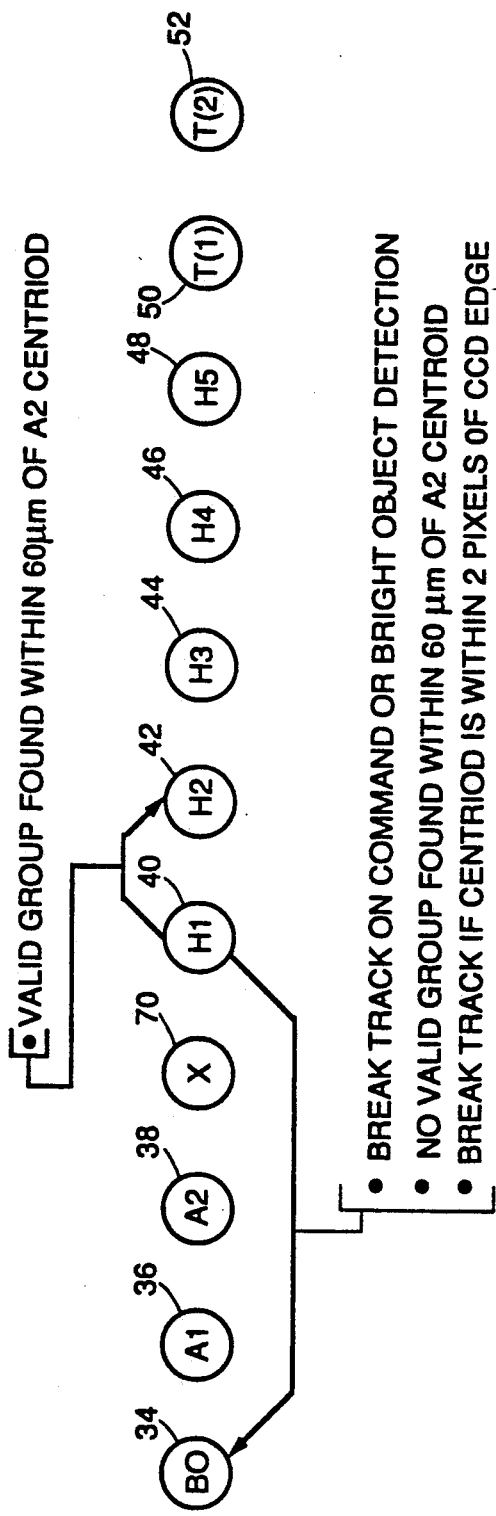
FIG. 7 is a state diagram illustrating the steps of the first handoff state.

Referring to FIG. 2, 3 and 7, the first handoff state 40, comprising a plurality of steps 41, is used to determine if the group selected in the first handoff state 40 meets a spacial map compare criteria with the group centroid found in second acquisition state 38. With a preset threshold (set to 800 electrons above computed local background) state 40 scans a 13×15 pixel window centered about the saved centroid of the second acquisition state. The local background is computed by finding the brightest pixel in the 13×15 pixel window and then calculating the average signal on a 2×8 subarray, in a corner of the 13×15 window farthest away from the bright pixel. Pixels which deviate from the average by more than two counts are excluded from the computation of the average. If more than 2 pixels of this subarray deviate by more than two counts from the average then the last computed average value is used. Next, state 40 saves the centroids of groups that meet the group size criteria, at least two and not more than twenty-five pixels in the group, which are above a preset group magnitude threshold. Then, the state selects the centroid of the group which is closest to the centroid of the group saved in the second acquisition state 38.

Following selection of a group, state 40 checks whether the selected group is within a radial compare window. In one embodiment a radial compare window of 60 $\mu$m is used. If the group is within 60 $\mu$m, the magnitude of the light source is input as the initial value of the magnitude rolling average accumulator 19 (see FIG. 1) contained within a portion of the apparatus memory 18, which maintains the average magnitude for the magnitudes determined from five previous scans. As will be seen later during track, the rolling average accumulator allows information to be collected about a light source so as to validate that source. The first handoff state 40 is different from the second acquisition state 38 in that it permits hot pixels when selecting a group. Finally, the first handoff state tests for bright objects. Using the same method previously described for the bright object state 34. The value of a star valid flag, which is used to indicate the validity of the data reported to the host 12, is held "false" during all handoff states 40, 42, 44, 46, and 48.

Transition from the state 40 is defined below: If a valid group is found within 60 $\mu$m of the centroid of the second acquisition state, then the first handoff state 40 is exited and the second handoff state 42 is entered. If no valid group is found within 60 $\mu$m of the second acquisition state, then the bright object test state is entered. Also if an interrupt tracking command is executed by a host, or a bright object is detected, or if the track is interrupted because the centroid is within two pixels of a CCD edge, then the bright object test state 34 is entered in this implementation.

Figure 8:
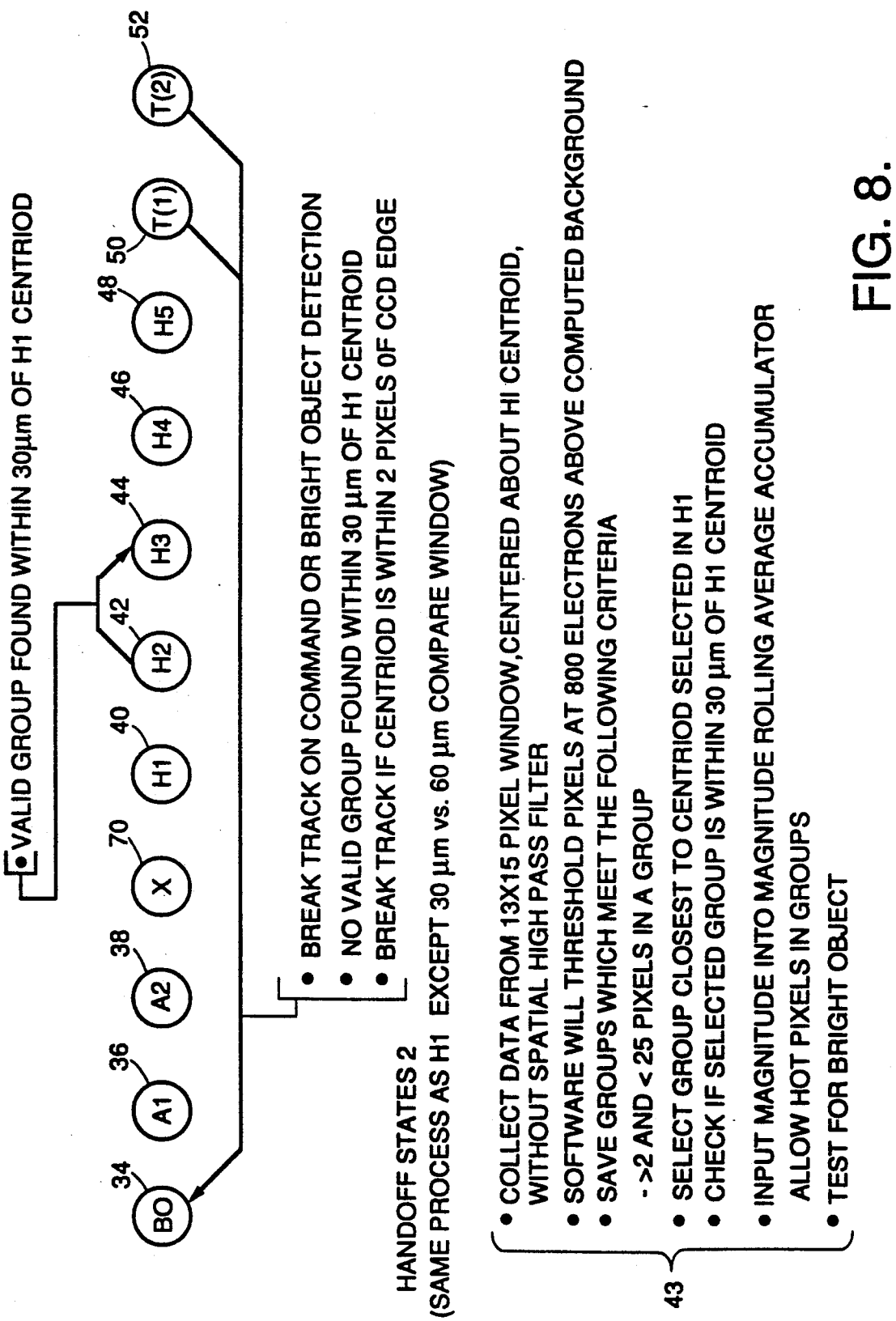
FIG. 8 is a state diagram illustrating the steps of the second handoff state.
Figure 9:
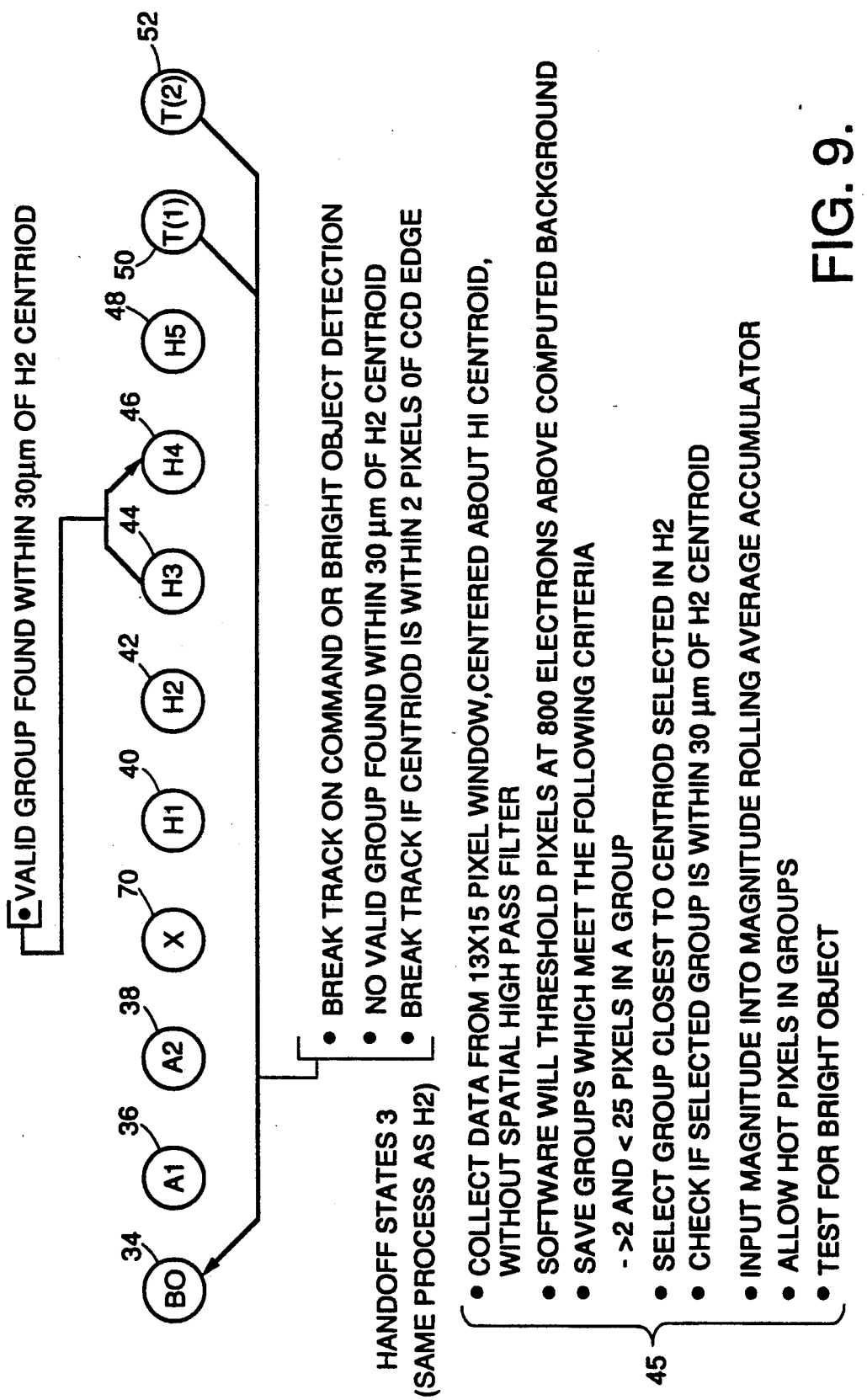
FIG. 9 is a state diagram illustrating the steps of the third handoff state.
Figure 10:
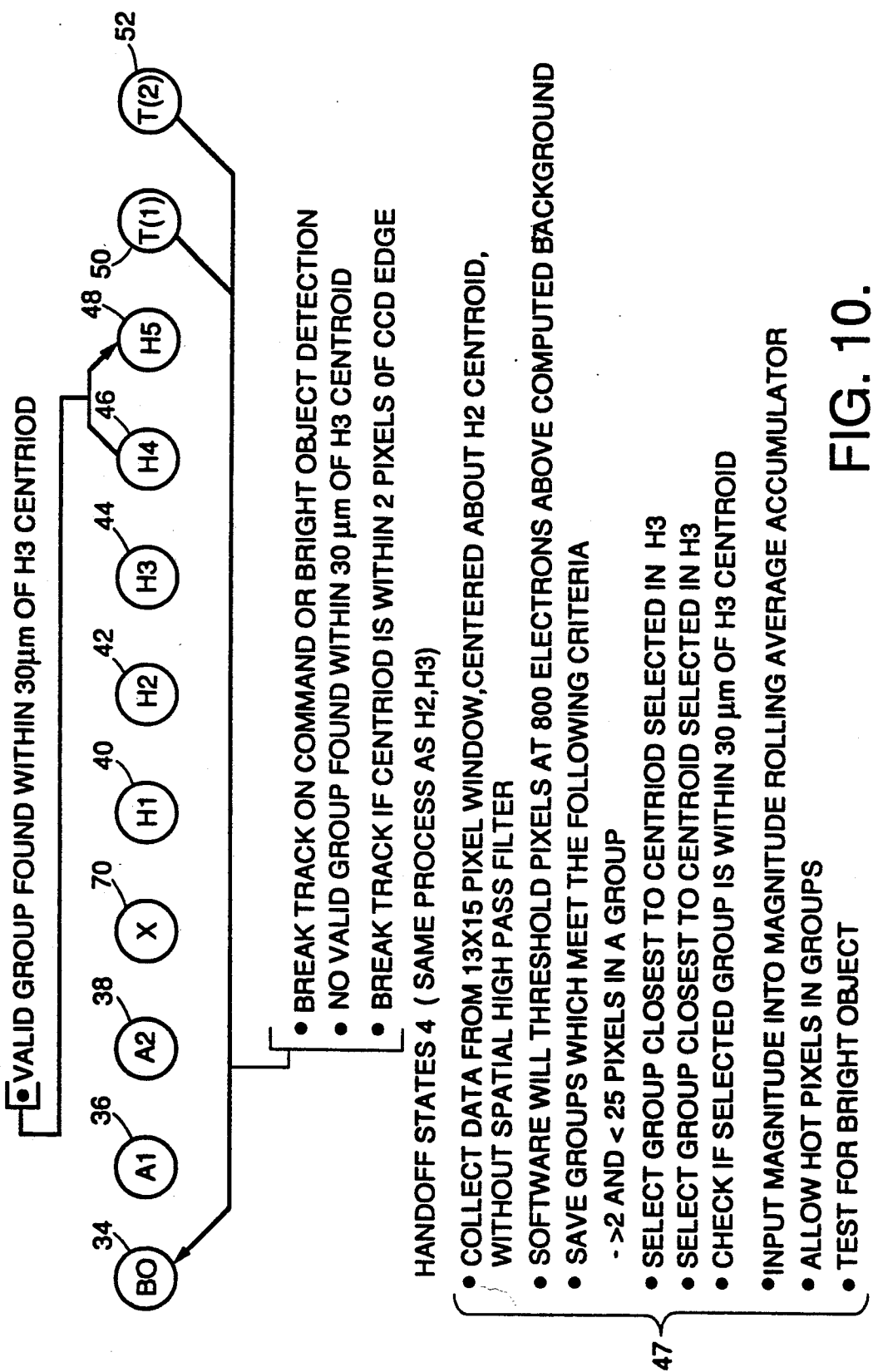
FIG. 10 is a state diagram illustrating the steps of the fourth handoff state.
Figure 11:
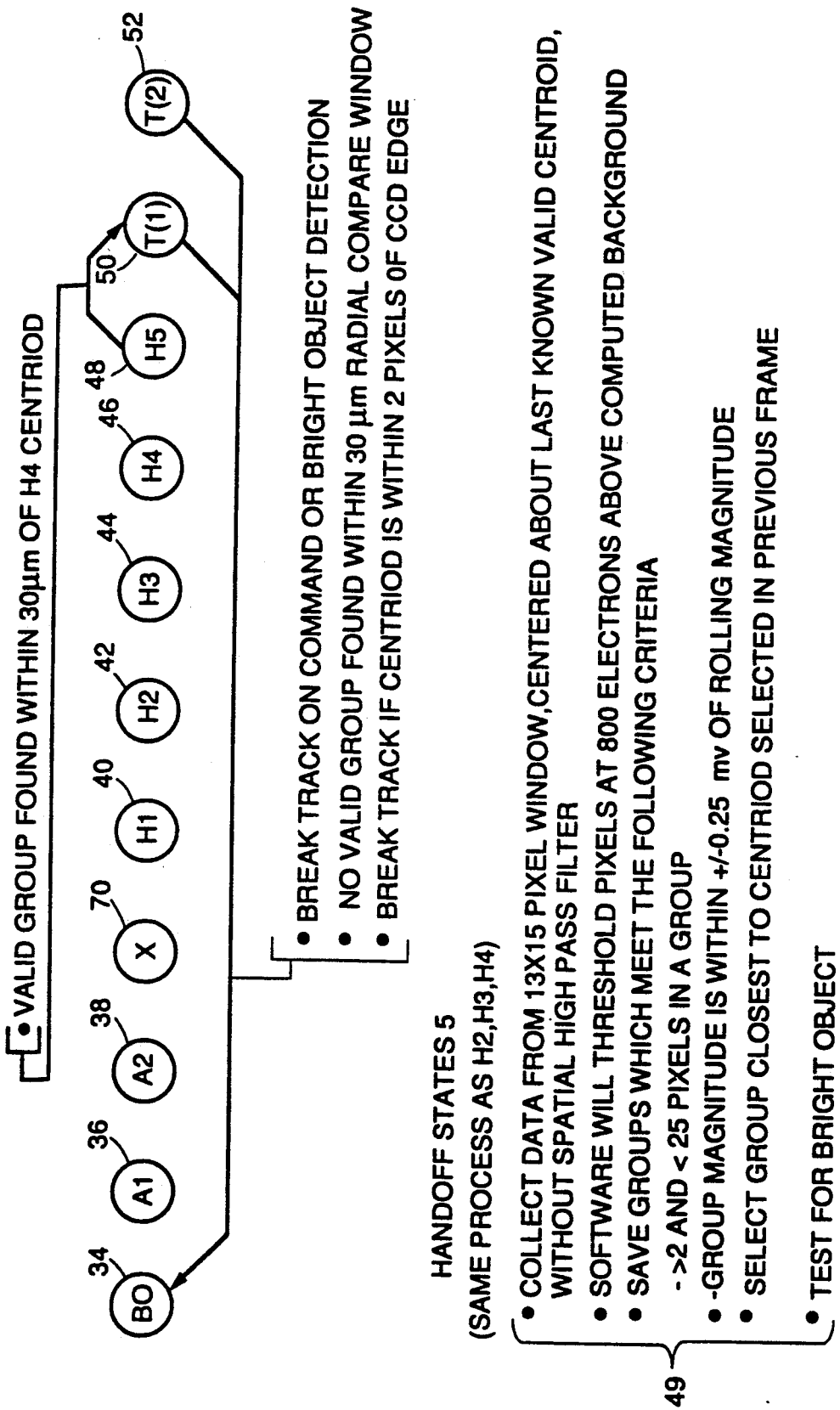
FIG. 11 is a state diagram illustrating the steps of the fifth handoff state.

Referring to FIGS. 2, 3, and 8, and steps 43, the second handoff state 42 is the same as the first handoff state 40, except for the use of a 30 $\mu$m comparison window instead of a 60 $\mu$m comparison window. The 60 $\mu$m comparison window is used for the first handoff state 40 to allow for group movement during an additional 100 ms transition time, represented by bubble 70 required to switch between the acquisition states and the handoff states.

First, with a preset threshold set to approximately 800 electrons above the computed local background illumination level, state 42 collects data from a 13×15 pixel window centered about the second acquisition state centroid. Next, state 42 saves groups that meet a group size criteria between two and twenty-five pixels in the group, which are above a preset group magnitude threshold. The state then selects a group closest to the centroid selected in the first handoff state 40. Following selection of a group, the state 42 checks whether the selected group is within 30 $\mu$m of the first handoff state centroid. If the group is within 30 $\mu$m, then the magnitude of the light source is the second input into the magnitude rolling average accumulator so as to continue to collect information on the light source for validation purposes. Finally, the second handoff state tests for bright objects.

Transition from the second hand off state 42 is similar to the first handoff state 40. If a valid group is found within 30 $\mu$m of the centroid of the first handoff state 40, then the second handoff state 42 is exited and a third handoff state 44 is entered. Otherwise, the bright object test state 34 is entered upon exiting from the second handoff state 42 if no valid group is found within 30 $\mu$m of the first handoff state centroid, if interrupt tracking command is executed by the host 12, if a bright object is detected, or if the track is interrupted because the centroid is within two pixels of a CCD edge.

Referring to FIGS. 2, 3, 9, 10 and 11, and steps 45, 47, and 49, the purposes and the procedures of the third handoff state 44, a fourth handoff state 46 and a fifth handoff state 48 are the same as that procedure described for the second handoff state 42. During each handoff state the magnitude rolling average accumulator is updated. If a valid group is found by the fifth handoff state 48 within 30 $\mu$m radius of a fourth handoff state centroid, the fifth handoff state is exited and a first tracking state 50 is entered. Otherwise, the transition procedure is similar to the transition procedure described for the second handoff state 42. The order of the selection criteria may be altered to meet specific requirements. The figures also identify the basis for updating the 13×15 window as well as the 30 $\mu$m radius during the handoff states.

Referring to FIGS. 2, 3 and 12, the tracking state 50 comprises a plurality of steps 51 and is used to track the light source after it is determined to be valid. First, with a background preset threshold set to 800 electrons above the local computed background illumination level, the tracking state scans a 13×15 pixel window which is centered about a last known valid centroid computed. Following the threshold setting, the track state saves groups having between two and twenty-five pixels in a group that have a group magnitude within a tolerance window, ±0.25 visual magnitude (Mv), of the rolling magnitude average collected by the five previously valid states. Next, the state 50 selects a group closest to the radial compare window center of the previous frame. State 50 then tests for the condition of whether the position of the selected group is within a 30 μm radial window of the centroid of the previous frame. If the condition is true, then a valid data flag is set to a "true" value. If the valid data flag is set to "true" and there are no hot pixels in the selected group, then the group magnitude is added to the group magnitude rolling average and the tracking state is reentered. If the value of the valid data flag is "true" and the value for the valid data flag (last frame) is "true", and there are no hot pixels in the selected group, then the star has been validated and the value for the star valid flag is set to "true" and the corrected centroid data is output to the host 12, on line, and the system transitions to the next track state ($T_{1+n}$).

Finally, state 50 tests for a bright object. Whenever a break track command is executed, a bright object is detected, a centroid is within 2 pixels of a CCD edge or a light source being tracked does not meet the criteria for a valid star for 10 consecutive frames, the tracking is broken and the track state is exited and the bright object state 34 is entered.

This track sequence continues as long as the data valid flag value is "true". When the system is in one of the track states and the star valid flag value is set to a "false" value because the group does not meet one of the valid data criteria; such as magnitude, position or size, then the magnitude and centroid of the group is not sent to the host 12. When the data valid flag value is "false", the apparatus updates the window and radius according to a set of rules described below.

First, if a group passes the group size and the magnitude criteria and meets the radial compare criteria, the centroid is within 30 μm of the center of the radial compare window, then the center of the radial compare window for the N+1 frame and the center of the 13×15 track window for the N+2 frame will be the frame N centroid. Second, if a group passes the group size criteria, between 2 and 25 pixels, and magnitude criteria, but does not meet the radial compare criteria, then the center of the radial compare window for the N+1 frame and the center of the 13×15 track window for the N+2 frame will be the closest star centroid in frame N.

Finally, if no group passes the group size and magnitude criteria, then the center of the radial compare window for the N+1 frame and the center of the 13×15 track window for the N+2 frame will be the center of the radial compare window for frame N.

The rules and procedure described above are repeated until a star is again validated or the apparatus has sequenced through 10 successive track states without being able to find a valid star.

If, within the 10 frames the star is again validated, then the communication of position and magnitude to the host 12 is reestablished. Otherwisw, the method and apparatus of the present invention exits from the tracking cycle, selects an acquisition band above the band in which the 13×15 pixel window was located, and returns to the bright object state 34.

Thus, what has been described is an apparatus and method to process data from a CCD device so as to acquire, validate and track a candidate object in a transient event rich environment with limited processing resources. It will be seen by those skilled in the art that the objects set forth above, and those made apparent from the preceding description, are efficiently attained and, since certain changes may be made in carrying out the invention. It is also to be understood that the following claims are intended to cover all of the generic and specific features of the invention herein described, and all statements of the scope of the invention which, as a matter of language, might be said to fall therebetween.

What is claimed is:

1. A method for tracking a light source in the field-of-view of a tracking system in a transient event rich environment, the system having a charge-coupled-device (CCD) array, a processor, a memory for storing digitized data, and a communication means for communicating data as to the position and brightness of said light source to a host, the method comprising the steps of:
   a) obtaining a first data set representative of the brightness of the field-of-view incident upon the pixels of an acquisition window array comprising at least a portion of said CCD array and storing said data set to memory;
   b) obtaining a second data set representative of the brightness of the field-of-view incident upon the pixels of said acquisition window and storing said data set to memory;
   c) comparing said first data set stored in memory with said second data set stored in memory so as to select the pixel coordinates of a target group of pixels from said second data set of said acquisition window and store the pixel coordinates of said target group in memory, said target group is determined from a group of contiguous pixels from said second data set having approximately the same brightness and location as a group of contiguous pixels from said first data set;
   d) obtaining a third data set representative of the brightness of the field-of-view incident upon the pixels of a tracking window array comprising at least a portion of said CCD array, wherein the center of said tracking window array has the same pixel coordinates as said target group of pixels, and storing said data to memory;
   e) comparing the location of said target group of pixels with the brightness and location of the pixels of said tracking window array so as to determine the pixel coordinates of a tracking group of pixels, said tracking group determined from a group of contiguous pixels having approximately the same brightness and position as said target group; and
   f) outputting to said host the pixel coordinates and brightness of said tracking group.

2. The method of claim 1, wherein the system further includes a dynamic threshold function and wherein said first data set and said second data set are obtained with said dynamic threshold function activated.

3. The method of claim 1, wherein said group of contiguous pixels from said first and second data sets comprise at least two pixels.

4. The method of claim 1, wherein said group of contiguous pixels from said first data set and said second data set is above a predetermined magnitude threshold.

5. The method of claim 1, wherein said target group is further determined by a first group of contiguous pixels from said second data set having approximately the same pixel location as a group of contiguous pixels in a target window, said target window comprising at least a portion of said acquisition window and having a center with the same pixel coordinates as a group of contiguous pixels from said first data set.

6. The method of claim 1, wherein said group of contiguous pixels of said third data set comprise at least two pixels.

7. The method of claim 1, wherein said group of contiguous pixels of said third data set is above a predetermined magnitude threshold.

8. The method of claim 1, wherein said tracking group is determined by selecting the group of contiguous pixels representing the brightest object within the field-of-view incident on said tracking window.

9. The method of claim 1, wherein said tracking group is determined by selecting a group of contiguous pixels closest to a predetermined location.

10. The method of claim 9, wherein said predetermined location is the center of said target group.

11. The method of claim 1, wherein said tracking group is determined by selecting a group of contiguous pixels located from the center of the tracking window in a predetermined direction, wherein said predetermined direction is derived from the location of the group of continuous pixels in the target window relative to the center of the target window.

12. The method of claim 1, wherein the method is returned to the step for obtaining a first data set if no target group is determined.

13. The method of claim 1, wherein the method is returned to the step for obtaining a first data set if no tracking group is determined.

14. The method of claim 1, wherein the output to said host further includes data as to the quality of the tracking group, wherein said quality indication is determined by the position and brightness of said tracking group.

15. The method of claim 14, wherein said tracking group quality indication is further determined by the centroid of the group of contiguous pixels being within a radius of a predetermined location.

16. The method of claim 14, wherein said tracking group quality is further determined by comparing tracking group brightness measurements with target group brightness measurements.

17. The method of claim 14, wherein the method is returned to the step for obtaining a third data set and wherein the pixel coordinates of said tracking group become the pixel coordinates of said target group.

18. The method of claim 17, wherein the system is returned to the step for obtaining a third data set as long or said tracking group is above a preset quality threshold.

19. A system for tracking a light source in the field-of-view of a tracking system in a transient event rich environment, the system having a charge-coupled-device (CCD) array, a processor, a memory for storing digitized data, and a communication means for communicating data as to the position and brightness of said light source to a host, the system comprising:

a) means for obtaining a first data set representative of the brightness of the field-of-view incident upon the pixels of an acquisition window array comprising at least a portion of said CCD array and means for storing said data set to memory;

b) means for obtaining a second data set representative of the brightness of the field-of-view incident upon the pixels of said acquisition window and means for storing said data set to memory;

c) means for comparing said first data set stored in memory with said second data set stored in memory so as to select the pixel coordinates of a target group of pixels from said second data set of said acquisition window and means for storing the pixel coordinates of said target group is in memory, said target group determined from a group of contiguous pixels from said second data set having approximately the same brightness and location as a group of contiguous pixels from said first data set;

d) means for obtaining a third data set representative of the brightness of the field-of-view incident upon the pixels of a tracking window array comprising at least a portion of said CCD array, wherein the center of said tracking window array has the same pixel coordinates as said target group of pixels, and means for storing said data to memory;

e) means for comparing the location of said target group of pixels with the brightness and location of the pixels of said tracking window array so as to determine the pixel coordinates of a tracking group of pixels, said tracking group determined from a group of contiguous pixels having approximately the same brightness and position as said target group; and f) means for outputting to said host the pixel coordinates and brightness of said tracking group.

20. The system of claim 19, wherein the system further includes a dynamic threshold function and wherein said first data set and said second data set are obtained with said dynamic threshold function activated.

21. The system of claim 19, wherein said group of contiguous pixels from said first and second data sets comprise at least two pixels.

22. The system of claim 19, wherein said group of contiguous pixels from said first data set and said second data set is above a predetermined magnitude threshold.

23. The system of claim 19, wherein said target group is further determined by a first group of contiguous pixels from said second data set having approximately the same pixel location as a group of contiguous pixels in a target window, said target window comprising at least a portion of said acquisition window and having a center with the same pixel coordinates as a group of contiguous pixels from said first data set.

24. The system of claim 19, wherein said group of contiguous pixels of said third data set comprise at least two pixels.

25. The system of claim 19, wherein said group of contiguous pixels of said third data set is above a predetermined magnitude threshold.

26. The system of claim 19, wherein said tracking group is determined by means for selecting the group of contiguous pixels representing the brightest object within the field-of-view incident on said tracking window.

27. The system of claim 19, wherein said tracking group is determined by means for selecting a group of contiguous pixels closest to a predetermined location.

28. The system of claim 27, wherein said predetermined location is the center of said target group.

29. The system of claim 19, wherein said tracking group is determined by means for selecting a group of contiguous pixels located from the center of the tracking window in a predetermined direction, wherein said predetermined direction is derived from the location of the group of continuous pixels in the target window relative to the center of the target window.

30. The system of claim 19, wherein the system is returned to the means for obtaining a first data set if no target group is determined.

31. The system of claim 19, wherein the system is returned to the means for obtaining a first data set if no tracking group is determined.

32. The system of claim 19, wherein the output of the means for outputting to said host further includes data as to the quality of the tracking group, wherein said quality is determined by the position and brightness of said tracking group.

33. The system of claim 19, wherein said tracking group quality indication is further determined by the distance of the centroid of said tracking group from a predetermined location.

34. The system of claim 33 wherein said tracking group quality is further determined by comparing tracking group brightness measurements with target group brightness measurements.

35. The system of claim 32, wherein the system is returned to the means for obtaining a third data set and where in the pixel coordinates of said tracking group become the pixel coordinates of said target group.

36. The system of claim 35, wherein the system is returned to the means for obtaining a third data set as long as said tracking group is above a preset quality threshold.

* * * * *